United States Patent [19]

Engel et al.

[11] Patent Number: 5,527,753
[45] Date of Patent: Jun. 18, 1996

[54] FUNCTIONALIZED AMINE INITIATORS FOR ANIONIC POLYMERIZATION

[75] Inventors: John F. Engel, Belmont; Conrad W. Kamienski, Gastonia; James A. Schwindeman, Shelby; Randy W. Hall, Kings Mountain; Robert C. Morrison, Gastonia; B. Troy Dover, Kings Mountain, all of N.C.

[73] Assignee: FMC Corporation, Philadelphia, Pa.

[21] Appl. No.: 354,998

[22] Filed: Dec. 13, 1994

[51] Int. Cl.⁶ ............................. C08F 4/48; B01J 31/12; B01J 31/18
[52] U.S. Cl. .................. 502/155; 502/157; 502/158; 502/167; 502/243; 526/180; 526/194; 526/335
[58] Field of Search ..................... 526/180; 502/157, 502/167, 155, 158, 243

[56] References Cited

U.S. PATENT DOCUMENTS

| | | | |
|---|---|---|---|
| 3,326,881 | 6/1967 | Uraneck et al. | 526/181 X |
| 3,776,964 | 12/1973 | Morrison et al. | 526/173 X |
| 3,862,100 | 1/1975 | Halasa et al. | 526/181 |
| 3,954,894 | 5/1976 | Kamienski et al. | 526/173 X |
| 4,039,593 | 8/1977 | Kamienski et al. | 526/173 X |
| 5,238,893 | 8/1993 | Hergenrother | 502/155 |
| 5,274,106 | 12/1993 | Lawson | 548/300.1 |
| 5,331,058 | 7/1994 | Sheperd et al. | 526/173 X |

FOREIGN PATENT DOCUMENTS 2255567  6/1991  United Kingdom.

Primary Examiner—Fred Zitomer
Attorney, Agent, or Firm—Charles C. Fellows; Robert L. Andersen

[57] ABSTRACT

A process for the preparation of hydrocarbon solutions of monofunctional amine initiators of the following general structures:

$$M-Q_n-Z-N(A(R^1R^2R^3))_2$$

or

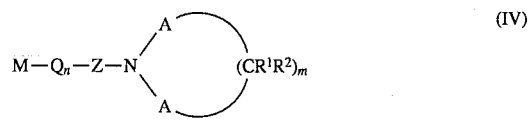

wherein M is defined as an alkali metal, selected from the group consisting of lithium, sodium and potassium, Q is a saturated or unsaturated hydrocarbyl group derived by incorporation of a compound selected from the group consisting of conjugated diene hydrocarbons and alkenyl substituted aromatic hydrocarbons; Z is a hydrocarbon tether group which contains 3–25 carbon atoms; A is an element selected from Group IVa of the periodic table and $R^1$, $R^2$, and $R^3$ are independently selected from hydrogen, alkyl, substituted alkyl, cycloalkyl, aryl or substituted aryl groups, m is an integer from 0 to 7, and n is an integer from 1 to 5, monofunctional amine initiators produced by the process, use of the initiators in a polymerization process and polymers produced by the polymerization process.

6 Claims, 1 Drawing Sheet

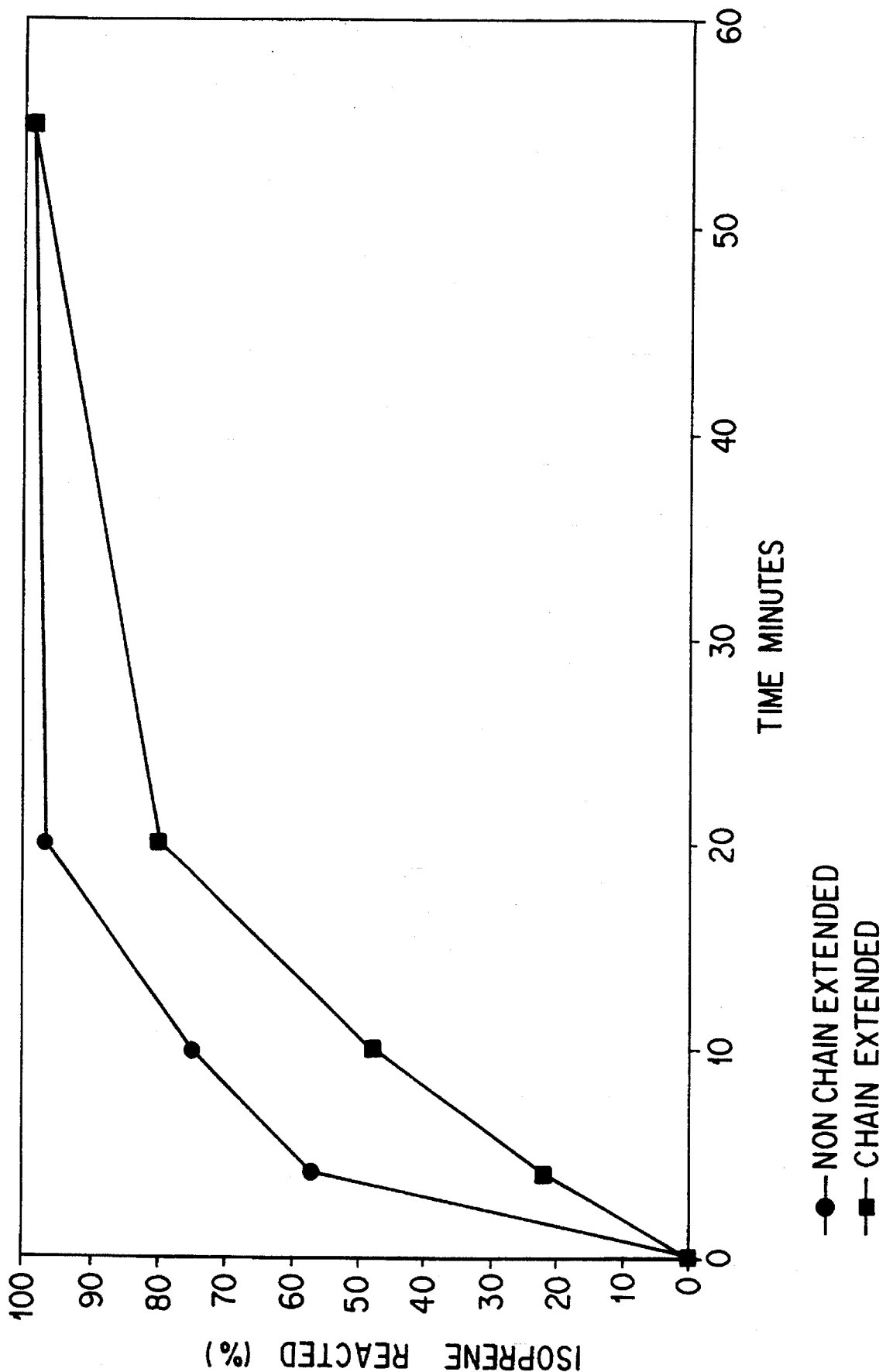

FUNCTIONALIZED AMINE INITIATORS FOR ANIONIC POLYMERIZATION

This invention concerns novel anionic initiators for use in polymerizing olefin-containing monomers, a process for making the anionic initiators, a process for the polymerization of olefinic-containing monomers using the anionic initiators of this invention, and polymers produced by this polymerization process.

Useful polymeric products are obtained by polymerizing olefinic-containing monomers in the presence of an organoalkali metal initiator and subsequently reacting the resulting polymer, containing an active alkali metal end group or groups, with a reagent which will couple the polymer molecules or replace the alkali metal with more stable reactive end groups.

Monofunctional silyl ether initiators, containing alkali metal end groups useful in effecting such polymerization reactions are disclosed in Great Britain published patent application 2,241,239, published Aug. 28, 1991. These monofunctional silyl ether initiators were demonstrated to be useful in producing polybutadienes having desirable characteristics such as a molecular weight of typically 1,000 to 10,000, 1,4 content of typically 90% and functionality of two.

Monofunctional anionic initiators possessing dialkylamino functionalities are useful in preparing dialkylamino terminated styrene—butadiene rubbers (SBR) (European Patent Application 593049A1 to Bridgestone Corporation). These elastomers have been shown to possess increased rebound, decreased rolling resistance, and lower heat build-up. They are useful in forming improved, energy efficient tires, power belts, and mechanical goods.

A co-pending U.S application Ser. No. 198,914, filed Feb. 18, 1994 discloses a process for the preparation of hydrocarbon solutions of monofunctional ether initiators of the following general structure:

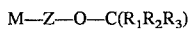

$$M-Z-O-C(R_1R_2R_3) \quad (I)$$

wherein M is defined as an alkali metal, preferably lithium; Z is defined as a branched or straight chain hydrocarbon tether group which contains 3–25 carbon atoms, optionally containing aryl or substituted aryl groups; and $R_1$, $R_2$, and $R_3$ are independently defined as hydrogen, alkyl, substituted alkyl, aryl or substituted aryl, and their employment as initiators in the anionic polymerization of olefin containing monomers in an inert, hydrocarbon solvent.

Analogous amine initiators (to formula I above) containing nitrogen in place of oxygen, having the formula

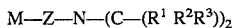

$$M-Z-N-(C-(R^1 R^2R^3))_2 \quad (II)$$

are also useful functional initiators in hydrocarbon solvent polymerizations (M. J. Stewart, N. Shepherd and D. M. Service, Brit. Polym. Jl., 22, 319–325 (1990)). However these amine functional initiators possess a low solubility in hydrocarbon solvents (less than 0.3 molar in aliphatic or cycloaliphatic solvents like hexane and cyclohexane). Such dilute solutions are expensive to ship commercially.

The present invention provides new monofunctional amine initiators having an improved solubility in hydrocarbon solvents of the general structure:

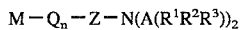

$$M-Q_n-Z-N(A(R^1R^2R^3))_2 \quad (III)$$

and

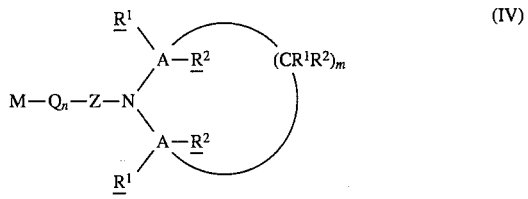

(IV)

wherein M is defined as an alkali metal, preferably lithium; Q is a saturated or unsaturated hydrocarbyl group derived by incorporation of a compound selected from the group consisting of conjugated diene hydrocarbons and alkanyl substituted aromatic hydrocarbons; Z is defined as a branched or straight chain hydrocarbon tether or connecting group which contains 3–25 carbon atoms, which tether may also contain pendent aryl or substituted aryl groups; A is an element selected from Group IVa of the periodic table and $R^1$, $R^2$, and $R^3$ are independently selected from hydrogen, alkyl, substituted alkyl, cycloalkyl, aryl or substituted aryl groups, m is an integer from 0 to 7, and n is an integer from 1 to 5, mixtures thereof with compounds of Formula (11) and a process for the preparation of these new amine initiators.

The process aspect of this invention for producing the initiators of formula (III) and (IV) reacts selected tertiary amino-1-haloalkyls where the tether groups contain 3 to 25 carbon atoms, with an alkali metal, preferably lithium, at a temperature between about 35° C. and about 130° C., preferably at the solvent reflux temperature, to form a monofunctional lithium amine initiator (of formula II) which is then reacted with a conjugated diene hydrocarbon or an alkenylsubstituted aromatic hydrocarbon in a predominantly alkane or cycloalkane reaction solvent containing 5 to 10 carbon atoms and mixtures of such solvents to produce a monofunctional amine initiator with an extended chain or tether between the metal atom (M) and nitrogen (N) in formula (III) and (IV) above and mixtures thereof with compounds of Formula (II). Q in formula (III) and (IV) is preferably derived from conjugated 1,3-dienes.

The amino-1-haloalkyls useful in practicing this invention are compounds of the following general structures:

$$X-Z-N(A(R^1R^2R^3))_2 \quad (V)$$

and

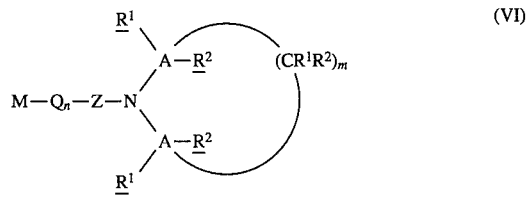

(VI)

wherein X is defined as a halogen, preferably chlorine or bromine; Z is defined as a branched or straight chain hydrocarbon tether or connecting group which contains 3–25 carbon atoms, which tether may also contain aryl or substituted aryl groups; A is an element selected from carbon and silicon of the periodic table and $R^1$, $R^2$, and $R^3$ are independently selected from hydrogen, alkyl, substituted alkyl, cycloalkyl, aryl or substituted aryl groups and m is an integer from 0 to 7.

Tertiary amino-1-haloalkyls useful in the practice of this invention include but are not limited to 3-(N,N-dimethylamino)-1-propyl halide, 3 -(N,N-dimethylamino)-2-methyl-1-propyl halide, 3-(N,N-dimethylamino)-2,2 -dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, 4-(N-isopropyl-N-methyl)-1-butyl halide, 5-(N-isopropyl-N-methyl)-1-pentyl halide, and 6-(N-isopropyl-N-methyl)-1-hexyl halide.

The alkali metal is selected from lithium, sodium and potassium, preferably lithium, used in preparing the monofunctional amines of formula (II) is used as a dispersion whose particle size usually does not exceed about 300 microns. Preferably the particle size is between 10 and 300 microns although coarser particle size lithium can be used. The lithium metal can contain 0.2 to 0.8 and preferably 0.3 to 0.5 weight percent sodium. The lithium metal is used in amounts of 90% of theoretical to a 400% excess above the theoretical amount necessary to produce the monofunctional alkali metal ether initiators. The reaction may be optionally aided by the presence of a coarse grade of sand, which acts as an abrasive to keep the surface of the metal clean.

The conjugated diene hydrocarbons used in producing the initiators of this invention are chosen from the group of unsaturated organic compounds that can be polymerized anionically in a reaction initiated by an alkali metal or its carbanionic derivative. These conjugated diene hydrocarbons include 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 1,3-octadiene, and myrcene. Among the dialkylbutadienes, it is preferred that the alkyl groups contain from 1 to 3 carbon atoms. There are numerous other known conjugated diene hydrocarbons useful in practicing this invention such as those disclosed, for instance, in U.S. Pat. No. 3,377,404. Of these conjugated diene hydrocarbons, most preferred are those which produce a more stable organolithium when reacted with the initial tertiary amine initiators (chain extension). Particularly useful are conjugated dienes such as 1,3-butadiene, isoprene and 2,3-dimethylbutadiene.

Anionically polymerizable alkenyl-substituted aromatic compounds useful in practicing this invention include, but are not limited to, styrene, alpha-methylstyrene, vinyltoluene, 1-vinylnaphthalene, 2-vinylnaphthalene, 1-alpha-methylvinylnaphthalene, 2-alphaomethylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 12. Examples of these latter compounds include 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Again, reference is made to U.S. Pat. No. 3,377,404 for disclosures of additional vinyl-substituted aromatic compounds. Non-polymerizable conjugated dienes and alkenyl substituted aromatic compounds such as 1,1-diphenylethylene and 2,4-hexadiene may also be used.

Chain extension can be carried out under a variety of conditions. Thus, the reaction can be carried out in the temperature range of −30° C. to +60° C., most preferably at 20°–50° C. The chain extension reaction may also be carried out in the presence of certain Lewis bases at temperatures which slow down polymerization relative to chain extension. The Lewis bases may be ethers, chosen from the group of aliphatic ethers such as diethyl ether, dimethyl ether, methyl tertiary butyl ether, tetrahydrofuran, and 2-methyltetrahydrofuran or tertiary amines chosen from the group of aliphatic amines such as trimethylamine, triethylamine, dimethylbutylamine, and N,N,N',N'-tetramethylenediamine. The proportion of these Lewis bases to the organolithiums being chain extended may be varied from about 0.1 mole to 3.0 moles per mole of organolithium. The reaction temperature used in the presence of these Lewis bases may be lowered to −30° C. to +20° C. to prevent attack by the organolithium on the Lewis base and will vary depending on the nature of the Lewis base, and the nature of the organolithium species. The chain extension reaction can be carried out either prior to isolation of the organolithium species from the solid lithium chloride by-product, or subsequent to the filtration.

The amount of conjugated diene hydrocarbon (olefinic monomer) used to chain extend the organolithium compound may be varied from about one mole to about five moles per mole of organolithium compound. Most preferable is a ratio of two moles of conjugated diene per mole of organolithium. Not all of the compound of Formula (II) must be chain extended. Thus, for example, up to as much as 50 mole percent of the compound of of Formula (II) may remain unextended to maintain good solubility.

Some examples of chain extended amine initiators are shown in Table I. Solubilities of these initiators are given both before and after chain extension (CE). Unexpectedly, at least a threefold increase in solubility was achieved on chain extension with use of as little as one or two moles of isoprene per mole of organolithium.

Monofunctional amine initiators prepared in accord with this process are products resulting from the chain extension of compounds which can include, but are not limited to, 3-(N,N-dimethylamino)-1-propyllithium, 3-(N,N-dimethylamino)-2-methyl-1-propyllithium, 3-(N,N-dimethylamino)-2,2-dimethyl-1-propyllithium, 3-(N,N-diethylamino)-1-propyllithium, 3-piperidino-1-propyllithium, 3-pyrrolidino-1-propyllithium, 3-hexamethylimino-1-propyllithium, and 4-(N-isopropyl-N-methyl)-1-butyllithium. The non-chain extended monofunctional amine precursors have rather limited solubility in aliphatic or cyloaliphatic hydrocarbon solvents.

The present invention provides a process for the anionic polymerization of olefinic-containing monomers comprising the steps of:

a) initiating polymerization of a conjugated diene hydrocarbon or an alkenylsubstituted aromatic hydrocarbon at a temperature of 10° C. to 70° C. with initiators having the formulas:

and

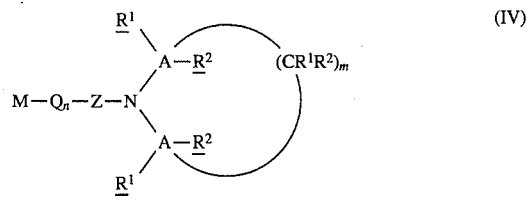

wherein M is an alkali metal, Q is a saturated or unsaturated hydrocarbyl group derived by incorporation of a compound selected from the group consisting of conjugated diene hydrocarbons and alkanylsubstituted aromatic hydrocarbons; Z is defined as a branched or straight chain hydrocarbon tether or connecting group which contains 3–25 carbon atoms, which may contain pendent aryl or substituted aryl groups; A is an element selected from Group IVa of the periodic table and $R^1$, $R^2$, and $R^3$ are independently selected from hydrogen, alkyl, substituted alkyl, cycloalkyl, substituted cycloalkyl, aryl or substituted aryl groups, m is an integer from 0 to 7, and n is an integer from 1 to 5;

b) optionally reacting the polymer with water, alcohol, ethyene oxide, oxygen, carbon dioxide, silicon tetrachloride, tin tetrachloride, divinylbenzene, m-diisopropenylbenzene and other materials known in the art to be useful for terminating, end capping or coupling of polymers;

c) optionally removing the protecting group;

d) optionally hydrogenating the polymer; and e) recovering a linear or branched polymer having one or more terminal functional groups.

It has been surprisingly found that the chain-extended amine initiators of this invention increase the rate of polymerization of monomers such as isoprene, relative to their non-chain extended counterparts.

The figure compares the overall rates of polymerization of isoprene using 3-(N,N-dimethylamino)-1-propyllithium and its isoprene chain-extended analog. The preparation and use of these two initiators are described in examples 1–4.

The inert solvent is preferably a non-polar solvent such as a hydrocarbon, since anionic polymerization in the presence of such non-polar solvents is known to produce polyenes with high 1,4-content from 1,3-dienes. Preferred solvents are aliphatic, cycloalipliatic, and aromatic hydrocarbons having from 3 to 12, preferably from 4 to 8, carbon atoms. Examples of suitable hydrocarbons are hexane, cyclohexane, toluene and benzene. Alkanes or cycloalkanes are the most preferred solvents. Ethereal or tertiary amine solvents can be added to the polymerization reaction to modify the microstructure of the resulting polymer, e.g., increase the proportion of 1,2 (vinyl) microstructure in a resulting polybutadiene.

The olefinic monomer to be anionically polymerized is preferably an alkenylaromatic or a conjugated diene. The alkenylaromatic or conjugated diene will be chosen from the group of unsaturated organic compounds that can be polymerized anionically (i.e. in a reaction initiated by an organoalkali metal). Suitable alkenylaromatics include the optionally-substituted styrenes and vinylnaphthalenes (vide supra). Suitable conjugated dienes will preferably contain from 4 to 12, especially from 4 to 8, carbon atoms per molecule. Examples of these compounds include the following: 1,3-butadiene, isoprene, 2,3-dimethyl-1,3-butadiene, 1,3-pentadiene, 2-methyl- 3-ethyl-1,3-butadiene, 2-methyl-3-ethyl-1, 3-pentadiene, 1,3-hexadiene, 2 -methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl- 1,3-pentadiene, 4,5-diethyl-1,3-octadiene, 2,4-diethyl-1,3-butadiene, 2,3-di-n-propyl- 1,3-butadiene, 2-methyl-3-isopropyl-1,3-butadiene, and myrcene.

Among the dialkylbutadienes, it is preferred that the alkyl groups contain from 1 to 3 carbon atoms. Of the above monomers 1,3-butadiene, isoprene, 2,3-dimethyl-1,3-butadiene and 1,3-pentadiene are preferred with 1,3-butadiene and isoprene being particularly preferred. The dienes may be polymerized alone, or in admixture with each other or with alkenylaromatic compounds to form random copolymers, or by charging the dienes to the reaction mixture sequentially, either with each other or with alkenylaromatic compounds, to form block copolymers.

The following examples further illustrate the invention.

EXAMPLE 1

Preparation of 3-(N,N-Dimethylamino)-1-propyllithium Chain Extended with 2 Moles of Isoprene, Lot 9314

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2× 70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37 ° C. with a heating mantle. The heat source was removed. 1-Chloro-3-(N,N-dimethylamino)propane, 19.64 grams (0.1615 mole) dissolved in 120 ml. cyclohexane was added dropwise. An exotherm (up to 52 ° C.) was detected after 7% of the feed had been added. A dry ice/hexane cooling bath was applied to maintain the reaction temperature at 41°–44° C. The total feed time was thirty-two minutes. An exotherm was noted until the last drop of feed was added, then the temperature was maintained at 36°–40° C. for an additional thirty minutes. The reaction mixture was then transferred to a sintered glass filter while still warm. The filtration was complete in three minutes with three psi argon pressure. This afforded a hazy suspension.

Yield=400 ml., 298.2 grams.

Active C–Li=0.361M (0.469 m/kg) @ 40° C.

Yield (based on active C–Li=87%.

The product crystallized from solution upon standing at room temperature. The concentration of the clear supernatant solution was about 0.3M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48°–49° C. for forty minutes. This afforded a slightly hazy golden solution, which was partially vacuum-stripped on the rotary evaporator to afford the product solution.

Yield=43.32 grams.

Active C–Li=1.36M (1.65 m/kg).

Recovered yield (based on active C–Li)=98.5%.

EXAMPLE 2

Preparation of 3-(N,N-Dimethylamino)-1-propyllithium Chain Extended with 2 Moles of Isoprene, Lot 9299

In another experiment, 5.153 grams (0.0756 mole) of isoprene (2.10 equivalents per mole of organolithium) was slowly added to 96.44 grams of a 0.3737 m/kg cyclohexane solution of 3-(N,N-dimethylamino)-1-propyllithium. No exotherm was detected. The reaction mixture was heated with an oil bath gradually to 63°–69° C., and the reaction mixture was maintained at this temperature for two hours. The reaction mixture was then allowed to cool to room temperature, which afforded a pale yellow solution.

Yield=102 grams.

Active C–Li=0.3546 m/kg.

An aliquot of this solution was carefully quenched with water. The organic layer was analyzed by Gas Chromatography (GC). All of the isoprene had been consumed.

EXAMPLE 3

Polymerization of Isoprene Using an Initiator Prepared by Chain Extension of 3-(N,N-Dimethylamino)-1-propyllithium with Isoprene, Lot 9304 (465–86)

To a solution of 41.3 grams of isoprene dissolved in 400 ml of dry cyclohexane at 60.7° C. was added 61.54 grams of a 0.3546 m/kg solution of 3-(N,N-dimethylamino)-1-propyllithium chain-extended with two moles of isoprene per mole of organolithium in cyclohexane (prepared in Example 2 above). The solution temperature rose to 76.3° C. during the addition of the initiator. The solution was then held at 60°–61° C. for one hour, and then the heat source was withdrawn. After about one hour, the reaction mixture had cooled to room temperature. The reaction mixture was quenched with 40 ml. of anhydrous degassed methanol. The hydrocarbon layer was separated, washed again with 40 ml of methanol, and stripped of solvent under vacuum on a rotary evaporator at a bath temperature of 45° C. This afforded a clear, light yellow, somewhat viscous, easily pourable oil.

Yield=44.0 grams (95.6% of theory).

GPC analysis indicated the polymer was monomodal.

$M_n$=2600 ($M_n$ theory=2229).

MWD=1.25.

EXAMPLE 4

Comparative Example

Polymerization of Isoprene Using 3-(N,N-Dimethylamino)-1-propyllithium as the Initiator, Lot 9329

To a solution of 40.0 grams of isoprene dissolved in 400 ml of dry cyclohexane at 60° C. was added 44.78 grams of a 0.361M (0.469 m/kg) solution of 3-(N,N-dimethylamino)-1-propyllithium all at once. The reaction exothermed to 79° C. in five minutes, and was then cooled back to 60° C. and held at this temperature for fifty minutes. The isoprene had been completely consumed, as indicated by GC analysis. The heat source was withdrawn. After about one hour, the reaction mixture had cooled to room temperature. The reaction mixture was quenched with 40 ml. of anhydrous degassed methanol. The hydrocarbon layer was separated, washed again with 40 ml of methanol, 0.04 grams of Cyanox 226 antioxidant was added, and stripped of solvent under vacuum on a rotary evaporator at a bath temperature of 45° C. This afforded a clear oil.

Yield=39.0 grams (93.5% of theory).

GPC analysis indicated the polymer was monomodal.

$M_n$=2300 ($M_n$ theory=2093).

MWD=1.27.

EXAMPLE 5

Preparation of 3-(N,N-Dimethylamino)-2-methyl-1-propyllithium Chain Extended with Isoprene, Lot 9226

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 8.20 grams (1.181 moles) was transferred to the flask with 250 ml cyclohexane. Coarse sand, 30.7 grams, was added to the reaction mixture. This suspension was stirred at 685 RPMs, and heated to 38° C. with a heating mantle. The heat source was removed. A solution of 1-chloro-3-(N,N-dimethylamino)-2-methyl-propane, 16.86 grams (0.1243 mole) dissolved in 50 ml. cyclohexane was added dropwise. An exotherm was detected. A dry ice/hexane cooling bath was applied to maintain the reaction temperature at 41°–44° C. The total feed time was thirty minutes. An exotherm was noted until the last drop of feed was added, then the temperature was maintained at 36°–40° C. for an additional thirty minutes. The reaction mixture was then transferred to a sintered glass filter while still warm. The filtration was complete in forty-five minutes with three psi argon pressure. This afforded a hazy, colorless suspension.

Yield=361 grams.

Active C–Li=0.304 m/kg).

Yield (based on active C–Li)=88%.

A dry 500 ml round bottom flask was fitted with a magnetic stir bar, and a Claisen adapter fitted with a thermocouple and an argon inlet. This apparatus was purged with argon, then 312 grams (0.0948 mole) of the solution prepared above was added to the flask. The reaction mixture was heated to 37.6° C. The heat source was removed. Isoprene, 6.92 grams (0.1015 mole, 1.07 equivalents) was then added over two minutes. The reaction mixture was then allowed to stir overnight at room temperature. This afforded a slightly hazy pale yellow solution. A partial strip of this solution, to 1.24 m/kg, on the rotary evaporator caused precipitation of crystals, even at 40° C. The reaction mixture was heated to 38° C., then additional isoprene, 10.22 grams (0.15 mole) and cyclohexane (40 ml.) were added. Essentially all of the crystals dissolved, even at room temperature. The reaction mixture was then partially vacuum-stripped on the rotary evaporator to afford the product solution.

Yield=112 grams.

Active C–Li=0.620M (0.785 m/kg).

EXAMPLE 6

Polymerization of Isoprene Using an Initiator Prepared by Chain Extension of 3-(N,N-Dimethylamino)-2-methyl-1-propyllithium with Isoprene, Lot 9336

To a solution of 40 grams of isoprene dissolved in 400 ml of dry cyclohexane at 57.3° C. was added all at once 26.8 grams of a 0.620M (0.785 m/kg) solution of 3-(N,N-dimethylamino)-2-methyl-1-propyllithium chain-extended with two moles of isoprene per mole of organolithium in cyclohexane (prepared in Example 5 above). The solution temperature rose quickly (5 minutes) to 77° C. The reaction mixture was cooled to 58 ° C. with a dry ice/hexane cooling bath, then maintained at 57°–62° C. with a heating mantle for about ninety minutes. The heat source was then withdrawn. After about one hour, the reaction mixture had cooled to room temperature. The reaction mixture was quenched with 40 ml. of anhydrous degassed methanol. The hydrocarbon layer was separated, washed again with 40 ml of methanol, 0.04 grams of Cyanox 226 antioxidant was added, and stripped of solvent under vacuum on a rotary evaporator at a bath temperature of 45° C. This afforded a viscous, slightly yellow product.

Yield=44.0 grams (94% of theory).
$M_n$=3200 ($M_n$ theory=2243).
MWD=1.30.

EXAMPLE 7

Preparation of 3-(Hexamethyleneimino)-1-propyllithium, Lot 9290

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.32 grams (1.487 moles) was transferred to the flask with 225 ml cyclohexane. Coarse sand, 40.0 grams, and 2.3 grams of 18 wt.% n-butyllithium (scavenger for impurities) were added to the reaction mixture. This suspension was stirred at 650 RPMs, and heated to 53.7° C. with a heating mantle. The heat source was removed. 1-Chloro-3-(hexamethyleneimino)propane, 24.21 grams (0.1378 mole) dissolved in 100 ml. cyclohexane was added dropwise. An exotherm was detected after 8.5% of the halide feed had been added. A dry ice/hexane cooling bath was applied to maintain the reaction temperature at 42°–47° C. The total feed time was ninety minutes. An exotherm was noted until the last drop of feed was added, then the temperature was maintained at 36°–40° C. for an additional thirty minutes. The reaction mixture was then transferred to a sintered glass filter while still warm. The filtration was complete in ninety-eight minutes with three psi argon pressure. This afforded a hazy suspension.

Yield=231 grams.
Active C–Li=0.393M (0.502 m/kg).
Yield (based on active C–Li)=84%.
The reactor and filter were rinsed with additional cyclohexane (2×50 ml.).
Yield=98 grams.
Active C–Li=0.237M (0.306 m/kg).
Total yield (based on active C–Li)=100%.

EXAMPLE 8

Preparation of 3-(Hexamethyleneimino)-1-propyllithium Chain Extended with Isoprene, Lot 9306

A dry 500 ml round bottom flask was fitted with a magnetic stir bar, and a Claisen adapter fitted with a thermocouple and an argon inlet. This apparatus was purged with argon, then 300 grams of a 0.438 m/kg solution of 3-(hexamethyleneimino)-1-propyllithium was added to the flask. The reaction mixture was heated to 40° C. The heat source was removed. Isoprene, 16.64 grams (0.2443 mole), 1.86 equivalents) was then added all at once. The reaction mixture was then stirred at 39°–47° C. for a period of two hours and twenty minutes, after which all the isoprene had been consumed, as indicated by GC analysis. The reaction mixture was allowed to cool to room temperature. The reaction mixture was then partially vacuum-stripped on the rotary evaporator to afford an amber, hazy oil.

Yield=58.27 grams.
Active C–Li=1.56M (1.96 m/kg).

EXAMPLE 9

Polymerization of Isoprene Using an Initiator Prepared by Chain Extension of 3-(Hexamethyleneimino)-1-propyllithium with Isoprene, Lot 9312

To a solution of 40.2 grams of isoprene dissolved in 400 ml of dry cyclohexane at 59.5° C. was added all at once 11.26 grams of a 1.96 m/kg solution of 3-(hexamethyleneimino)-1-propyllithium chain-extended with two moles of isoprene per mole of organolithium in cyclohexane (prepared in Example 8 above). The solution temperature rose quickly (4 minutes) to 76.4° C. The reaction mixture was cooled to 58° C. with a dry ice/hexane cooling bath, then maintained at 58°–62° C. with a heating mantle for about five hours. The heat source was then withdrawn. After about one hour, the reaction mixture had cooled to room temperature. The reaction mixture was quenched with 40 ml. of anhydrous degassed methanol. The hydrocarbon layer was separated, washed again with 40 ml of methanol, and stripped of solvent under vacuum on a rotary evaporator at a bath temperature of 45° C. This afforded a slightly yellow product.

Yield=44.0 grams (97% of theory).
GPC analysis indicated the polymer was monomodal.
$M_n$=2100 ($M_n$ theory=2188).
MWD=1.23.

EXAMPLE 10

Preparation of 3-(Hexamethyleneimino)-1-propyllithium Chain Extended with Isoprene, Lot 9306

A 500 ml. Erlenmeyer flask was fitted with a magetic stir bar, and an argon onlet. This apparatus was purged with argon, then charged with 132.1 grams (0.6226 mole) of 1-chloro-3-(hexamethyleneimino)-propane hydrochloride salt. This salt was dissolved in 150 ml. water. This was an endothermic dissolution, and afforded a clear, colorless solution. Then 93.57 grams (1.17 mole, 1.88 equivalents) 50% aqueous sodium hydroxide solution was added dropwise. A mild exotherrm ensued, with the formation of a fine white precipitate. Two distinct layers formed. The reaction mixture was transferred to a seperatory funnel, and the layers were separated. The aqueous layer, 264.71 grams, had pH=9, and contained very little organic material by GC analysis. The organic layer contained the desired product, 1-chloro-3-(hexamethyleneimino)-propane. This material treated with 6.32 grams of sodium hydroxide pellets, and was stored in a freezer.

Yield=108.23 grams (98.8%).
GC assay=95.5%.

A 500 ml, three-necked Morton flask was equipped with a mechanical stirrer, a 125 ml. pressure-equalizing addition funnel, and a Claisen adapter fitted with a thermocouple, a dry-ice condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 13.33 grams (1.92 moles) was transferred to the flask with 220 ml cyclohexane. This suspension was stirred at 700 RPMs, and heated to 52.2° C. with a heating mantle. The heat source was removed. Ten ml. of a solution of 1-chloro-3-(hexamethyleneimino)propane, 24.00 grams (0.1366 mole), dissolved in 100 ml. cyclohexane was added. No exotherm was detected.

An additional 10 ml. of the halide feed solution was added. An exotherm was detected almost immediately. A dry ice/hexane cooling bath was applied to maintain the reaction temperature at 55°–60° C. The remaining halide feed was added dropwise. The total feed time was forty-five minutes. The addition funnel was rinsed with 25 ml. cyclohexane. The reaction mixture was allowed to stir for thirty minutes, then isoprene, 19.10 grams (0.280 mole, 2.05 equivalents), was added dropwise. A mild exotherm was detected during this addition. The total isoprene feed time was fifty minutes. GC analysis indicated all the isoprene had been consumed. The reaction mixture was stirred overnight at 350 RPMs, under a blanket of argon. The reaction mixture was then transferred to a sintered glass filter which contained dry filter aid, 7 grams. The filtration was complete in twenty-two minutes with three psi argon pressure. This afforded a dark, golden, slightly hazy solution.

Yield=341.8 grams.
Active C–Li=0.268M (0.338 m/kg).
Yield (based on active C–Li)=84.5%.

EXAMPLE 11

Preparation of 3-(Piperidino)-1-propyllithium, and Chain Extension with Isoprene Lot 9290

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 12.43 grams (1.791 moles) was transferred to the flask with 200 ml. cyclohexane. Coarse sand, 43.5 grams, and 2.35 grams of 18.3 wt. % n-butyllithium (scavenger for impurities) were added to the reaction mixture. This suspension was stirred at 580 RPMs, and heated to 40.7° C. with a heating mantle. The heat source was removed. Fifteen ml. of 1-chloro-3 -(piperidino)-propane, 25.16 grams (0.1556 mole) dissolved in 100 ml. cyclohexane was added rapidly. An exotherm was detected after about two minutes. The stirring rate was increased to 780 RPMs. A dry ice/hexane cooling bath was applied to maintain the reaction temperature at 40°–45° C. The remaining halide feed solution was added dropwise. The total feed time was twenty-three minutes. The reaction mixture was stirred overnight at room temperature, heated to 62° C., then transferred to a sintered glass filter.

Yield=215.8 grams, Solution A.
Active C–Li=0.199 m/kg.
Yield (based on C–Li)=16.5%.

The muds were reslurried with fresh, hot cyclohexane (2×50 ml.).

Yield=79.8 grams, Solution B.
Active C–Li=0.058 m/kg.
Yield (based on C–Li)=3%.

The remaining solid in the filter was washed with warm tetrahydrofuran, three times.

Yield=87 grams, Solution C.
Active C–Li=0.581 m/kg.
Yield=112.4 grams, Solution D.
Active C–Li=0.370 m/kg.
Yield=85 grams, Solution E.
Active C–Li=0.075 m/kg.
Yield (based on C–Li) of solutions C, D & E=64%.
Yield (based on C–Li) of solutions A, B, C, D & E=83.5%.

A 500 ml. flask was equipped with a reflux condenser, and a magnetic stir bar. This apparatus was dried in an oven overnight at 125° C., assembled hot, and allowed to cool to room temperature in a stream of argon. The flask was charged with Solution A, 119.62 grams (0.0238 mole), and Solution B, 59.34 grams (0.0034 moles). The reaction mixture was warmed on an oil bath to afford a clear solution. Isoprene, 3.17 grams (0.0544 moles, 2.0 equivalents) was then added to the reaction mixture. The reaction mixture was stirred at 39°–42° C. for one hour and thirty-five minutes, then allowed to cool to room temperature. The reaction mixture was then partially vacuum-stripped on the rotary evaporator to afford an light amber, clear oil.

Yield=27.76 grams.
Active C–Li=0.614 m/kg.

EXAMPLE 12

Polymerization of Isoprene Using an Initiator Prepared by Chain Extension of 3-(Piperidino)-1-propyllithium with Isoprene, Lot 9328

To a solution of 24.7 grams of isoprene dissolved in 250 ml of dry cyclohexane at 60.7° C. was added all at once 25 ml. of a 0.496M (0.614 m/kg) solution of 3-(piperidino)-1-propyllithium chain-extended with two moles of isoprene per mole of organolithium in cyclohexane (prepared in Example 11 above). The solution temperature rose quickly (4 minutes) to 75.9° C. The reaction mixture was cooled to 59.7° C. with a dry ice/hexane cooling bath, then maintained at 58°–62° C. with a heating mantle for about five hours. The heat source was then withdrawn. After about one hour, the reaction mixture had cooled to room temperature. The reaction mixture was quenched with 40 ml. of anhydrous degassed methanol. The hydrocarbon layer was separated, washed again with 40 ml. of methanol, and stripped of solvent under vacuum on a rotary evaporator at a bath temperature of 45 ° C. This afforded a slightly yellow polymer product.

Yield=27 grams (96.6% of theory).
GPC analysis indicated the polymer was monomodal.
$M_n$=2500 ($M_n$ theory=2436).
MWD=1.31.

TABLE

| Structure | Solubility (M) at RT | |
|---|---|---|
| | Non-CE | CE* |
| CH$_3$–N(CH$_3$)–CH$_2$CH$_2$CH$_2$–Li | 0.3 | 1.0 |
| CH$_3$–N(CH$_3$)–CH$_2$CH(CH$_3$)–Li | 0.15 | 0.6 |
| piperidino–CH$_2$CH$_2$CH$_2$–Li | 0.02 | 0.5 (0° C.) |
| (8-membered ring)N–CH$_2$CH$_2$CH$_2$–Li | 0.3 | 1.6 (0° C.) |

*contain 2 isoprene

What is claimed is:

1. Monofunctional amine anionic polymerization initiators comprising compounds of the formula;

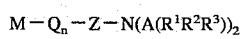

M—Q$_n$—Z—N(A(R$^1$R$^2$R$^3$))$_2$ or

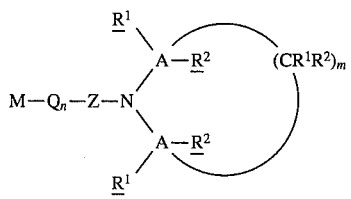

wherein M is an alkali metal selected from the group consisting of lithium, sodium and potassium, Q is a saturated or unsaturated hydrocarbybl group selected from the group consisting of $C_4$ to $C_{10}$ alkene hydrocarbons and $C_8$ to $C_{12}$ alkanyl substituted aromatic hydrocarbons; Z is hydrocarbon tether group which contains 3–25 carbon atoms, A is an element selected from carbon and silicon and $R_1$, $R^2$, and $R^3$ are independently selected from hydrogen, alkyl, substituted alkyl, cycloalkyl, aryl or substituted aryl groups, m is an integer from 1 to 7, and n is an integer from 1 to 5.

2. The compound of claim 1 where in the alkali metal is selected from the group consisting of lithium and sodium.

3. The compound of claim 1 where in the branched or straight chain hydrocarbon tether group contains 3 to 8 carbon atoms.

4. The compound of claim 1 wherein the alkali metal is lithium.

5. The compound of claim 4 wherein the lithium metal contains 0.2 to 0.8 weight percent sodium.

6. The compound of claim 4 wherein the lithium metal contains 0.3 to 0.5 weight percent sodium.

* * * * *